United States Patent
Slavin (10) Patent No.: US 6,690,826 B2
(45) Date of Patent: Feb. 10, 2004

(54) SYSTEM AND METHOD FOR DETECTING TEXT IN MIXED GRAPHICS DATA

(75) Inventor: Keith R. Slavin, Beaverton, OR (US)

(73) Assignee: Micron Technology, Inc., Boise, ID (US)

(*) Notice: Subject to any disclaimer, the term of this patent is extended or adjusted under 35 U.S.C. 154(b) by 500 days.

(21) Appl. No.: 09/746,636

(22) Filed: Dec. 21, 2000

(65) Prior Publication Data

US 2002/0081030 A1 Jun. 27, 2002

(51) Int. Cl.[7] ............................. G06K 9/46; G06K 9/66
(52) U.S. Cl. ...................... 382/192; 345/589; 345/606; 345/613; 345/614; 348/577; 348/582; 348/589; 348/600; 382/164; 382/176; 382/209; 382/232; 382/274
(58) Field of Search ................................ 382/164–166, 382/170–171, 176, 190–194, 209, 217–219, 232, 274–275, 293–300; 345/589, 606, 800; 348/575–577, 581–582, 587, 589, 600

(56) References Cited

U.S. PATENT DOCUMENTS

| 5,809,182 A | 9/1998 | Ward et al. ................. 382/298 |
| 5,845,010 A | 12/1998 | Silverbrook et al. ........ 382/232 |
| 5,867,608 A | 2/1999 | Rice ............................ 382/277 |
| 6,115,497 A * | 9/2000 | Vaezi et al. ................. 382/174 |
| 6,229,550 B1 * | 5/2001 | Gloudemans et al. ....... 345/435 |
| 6,266,100 B1 * | 7/2001 | Gloudemans et al. ....... 348/587 |
| 6,320,981 B1 * | 11/2001 | Yada .......................... 382/168 |
| 6,545,686 B1 * | 4/2003 | Fadden ....................... 345/582 |
| 6,591,010 B1 * | 7/2003 | Russin ....................... 382/209 |

* cited by examiner

Primary Examiner—Jayanti K. Patel
Assistant Examiner—Gregory Desire
(74) Attorney, Agent, or Firm—Dorsey & Whitney LLP (57) ABSTRACT

A system and method for identifying whether sample values of pixel samples in a sample region have two or fewer different sample values represented, such as in graphics data representing text images. Identification is performed by hierarchically dividing the samples of the sample region into sample pairs and comparing the sample values of a first sample pair and a second sample pair to determine if two or fewer sample values are represented by the sample values of the first and second sample pairs. Where two or fewer levels are represented by the sample values of the samples, a tally value is generated and the first and second sample values are recorded. The recorded sample values are compared to the sample values of another sample pair to determine if two or fewer values are represented therein. If so, a new tally value is generated and the sample values are recorded. Comparing and recording continues until the remaining sample pairs of the sample region have been compared and a combined tally value indicative of whether two or fewer sample values are represented by the samples of the sample region is produced.

41 Claims, 5 Drawing Sheets

SYSTEM AND METHOD FOR DETECTING TEXT IN MIXED GRAPHICS DATA

TECHNICAL FIELD

The present invention is related generally to the field of computer graphics, and more particularly, to determining from a sample of pixels the presence of graphics data including two or fewer color levels.

BACKGROUND OF THE INVENTION

As display devices of various sizes and increased resolution have been developed and the demand for them have increased, the ability to resize and resample source images and create destination images to take advantage of the various sized and higher resolution displays is a desirable operation. However, the resampled destination image must retain an acceptable image quality compared to the source image. That is, the destination image should appear to retain at least a similar resolution, and have appear to have nearly the same color balance, contrast, and brightness as the original source image. Otherwise, rather than accurately reproducing the source image, the resampling operation will compromise the image quality by introducing image distortion. As a result, various resampling algorithms have been developed in order to create high quality graphics images.

Graphics images that are displayed on a display device often consist of mixed types of graphics images, such as a video graphics images displayed simultaneously with stationary images of text or line borders. A common example of such a graphics image is a Web page having a video portion separated from an adjacent text portion by a line border. Another example would be a computer desktop having in a multimedia player window a video image and in a background window or on the desktop text images.

Resampling a source graphics image having mixed types of graphics images, such as video and text, poses special challenges because the resampling algorithm used for one type of graphics image may not be efficient, or effective for resampling another type of graphics image. For example, resampling graphics data representing text images differs from resampling graphics data representing video in that the resampling process used to interpolate destination pixels from the source image for text typically assumes some sort of plateau model around each pixel with no overshoots between pixels of different color levels. Therefore, only input samples either side of an output sample contribute to the value of the destination pixel. As a result, if text resampling models are used for graphics data representing video, it tends to produce blurry transitions on a computer monitor, and original image line structure is often visible. Moreover, algorithms for resampling bitmaps are generally more difficult to design than those for resampling video signals, because there is an expectation of presenting clear and legible text in an output image. Also, there is no restriction in how close the viewer gets the monitor, unlike video where 3× picture height is the recommended minimum viewing distance.

As a result, graphics data representing text is sometimes treated differently than graphics data representing non-text images for various graphics operations. Where the text and non-text images are treated differently, it becomes necessary to be able to identify the different types of graphics data. One such method of text detection is described in U.S. Pat. No. 5,845,010 to Silverbrook et al. issued Dec. 1, 1998. As described therein, pixels of a JPEG cell are tested for "saturation" to identify graphics data containing text, where saturation refers to the pixel being within a defined percentage of full color saturation. Various criteria can be set to improve the identification method. For example, the cell will be identified as text if a defined percentage of pixels in the cell are saturated, or if a defined percentage of pixels in the cell are within a defined intensity slope between two saturated pixels. However, the method described in the aforementioned patent is susceptible to incorrectly identifying video containing saturated elements as text. Similarly, graphics data including text where the pixels are not fully "saturated" may escape detection. Inaccurate identification of text in graphics data may result in treating the different types of graphics data incorrectly, possibly causing image distortion and reduced image quality and resolution.

Therefore, there is a need for an alternate method and system for identifying graphics data containing text images.

SUMMARY OF THE INVENTION

The present invention relates to a system and method for identifying whether sample values of pixel samples in a sample region have two or fewer different sample values represented. Such a system and method may be used to identify graphics information representing text images. The system performs the identification operation by hierarchically sub-dividing regions with even numbers of samples into two sub-regions with even number of samples, and re-dividing until all regions contain just two samples each. Each two sample region is then processed to determine if it contains two or one sample levels, returning the sorted sample values and number of different levels to its parent region in the hierarchy. The parent then determines if there are a tally of 3 or more, 2, or 1 sample levels in its two regions, and returns this tally and the sorted sample values if 2 levels lie in the region. This process continues up the hierarchy until the entire region of interest can determine if 3 or more, 2, or 1 sample levels lie within it. The tally value generated for the sample region is indicative of whether two or fewer sample values are represented by the samples of the sample region.

DETAILED DESCRIPTION OF THE INVENTION

Embodiments of the present invention provide a method and system for determining if a region of sample pixels have more than two different color values or color levels. Certain details are set forth below to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
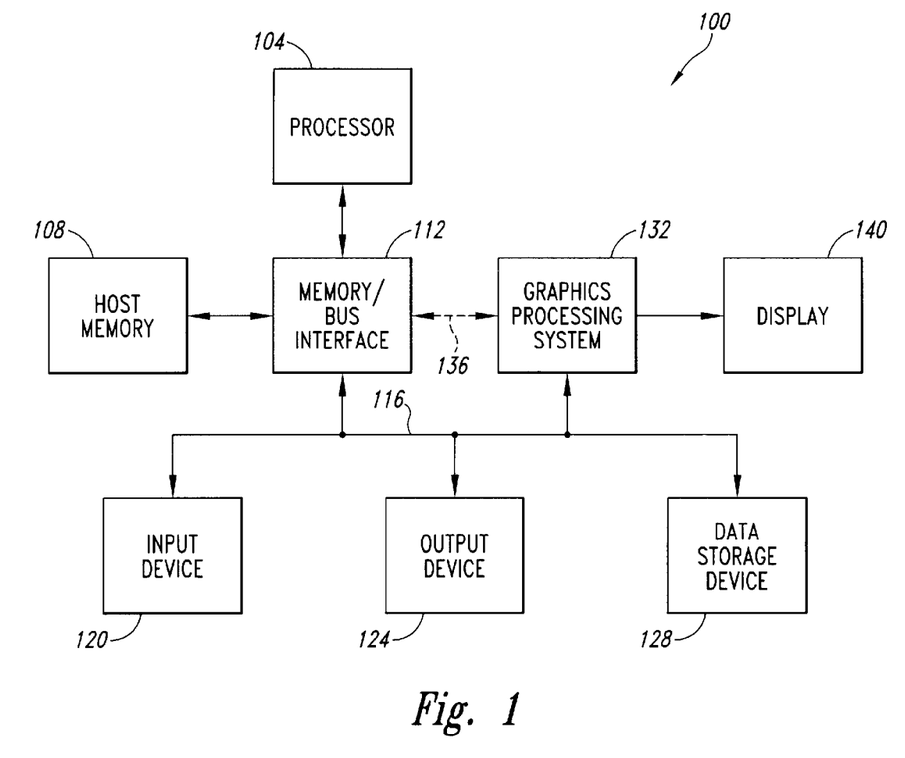
FIG. 1 is a block diagram of a computer system in which embodiments of the present invention are implemented.

FIG. 1 illustrates a computer system 100 in which embodiments of the present invention are implemented. The computer system 100 includes a processor 104 coupled to a host memory 108 through a memory/bus interface 112. The memory/bus interface 112 is coupled to an expansion bus 116, such as an industry standard architecture (ISA) bus or a peripheral component interconnect (PCI) bus. The computer system 100 also includes one or more input devices 120, such as a keypad or a mouse, coupled to the processor 104 through the expansion bus 116 and the memory/bus interface 112. The input devices 120 allow an operator or an electronic device to input data to the computer system 100. One or more output devices 120 are coupled to the processor 104 to provide output data generated by the processor 104. The output devices 124 are coupled to the processor 104 through the expansion bus 116 and memory/bus interface 112. Examples of output devices 124 include printers and a sound card driving audio speakers. One or more data storage devices 128 are coupled to the processor 104 through the memory/bus interface 112 and the expansion bus 116 to store data in, or retrieve data from, storage media (not shown). Examples of storage devices 128 and storage media include fixed disk drives, floppy disk drives, tape cassettes and compact-disc read-only memory drives.

The computer system 100 further includes a graphics processing system 132 coupled to the processor 104 through the expansion bus 116 and memory/bus interface 112. Optionally, the graphics processing system 132 may be coupled to the processor 104 and the host memory 108 through other types of architectures. For example, the graphics processing system 132 may be coupled through the memory/bus interface 112 and a high speed bus 136, such as an accelerated graphics port (AGP), to provide the graphics processing system 132 with direct memory access (DMA) to the host memory 108. That is, the high speed bus 136 and memory bus interface 112 allow the graphics processing system 132 to read and write host memory 108 without the intervention of the processor 104. Thus, data may be transferred to, and from, the host memory 108 at transfer rates much greater than over the expansion bus 116. A display 140 is coupled to the graphics processing system 132 to display graphics images. The display 140 may be any type of display, such as a cathode ray tube (CRT), a field emission display (FED), a liquid crystal display (LCD), or the like, which are commonly used for desktop computers, portable computers, and workstation or server applications.

Figure 2:
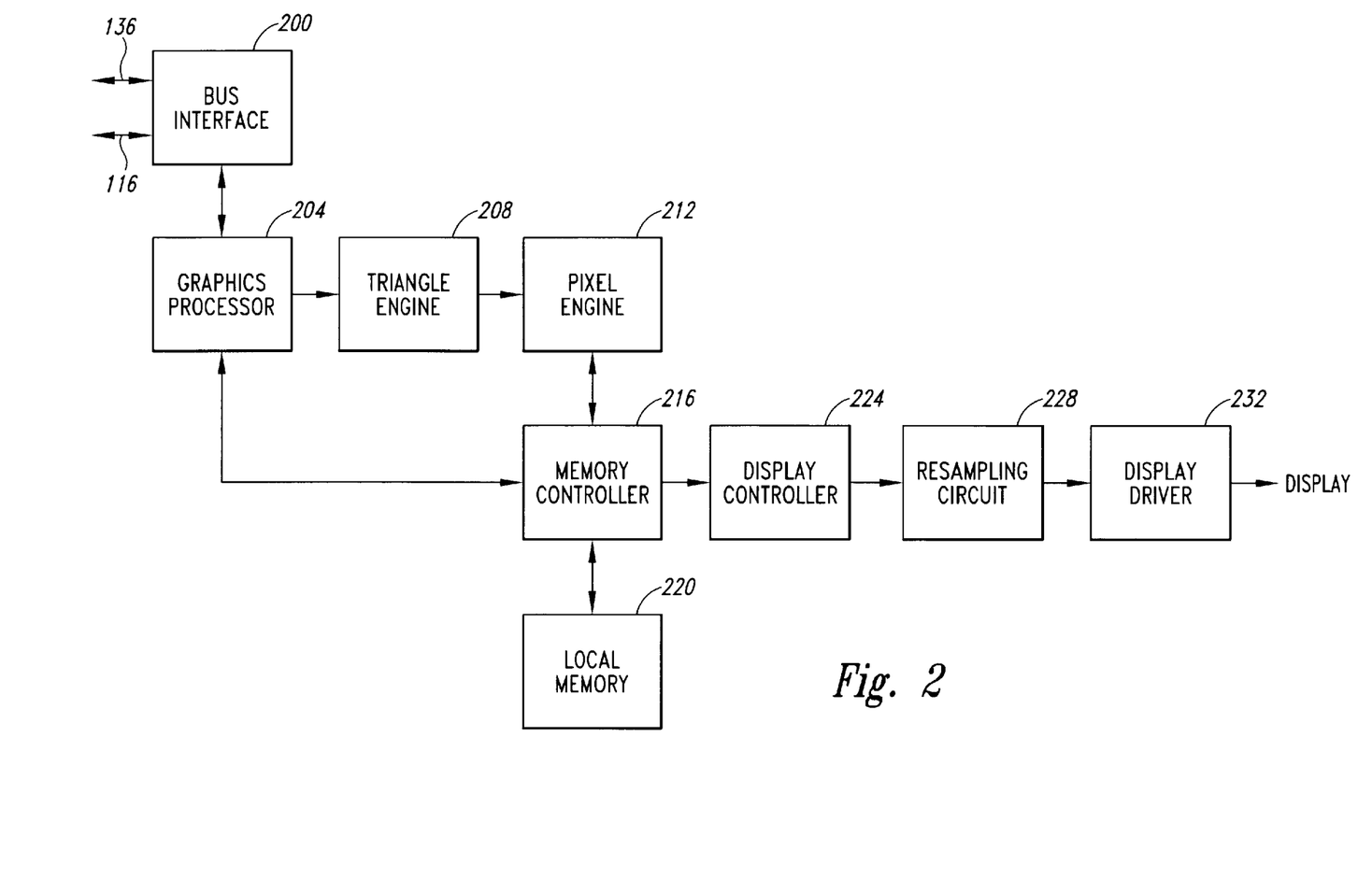
FIG. 2 is a block diagram of a graphics processing system in the computer system of FIG. 1.

FIG. 2 illustrates circuitry included within the graphics processing system 132 for performing various three-dimensional (3D) graphics functions. As shown in FIG. 2, a bus interface 200 couples the graphics processing system 132 to the expansion bus 116. In the case where the graphics processing system 132 is coupled to the processor 104 and the host memory 108 through the high speed data bus 136 and the memory/bus interface 112, the bus interface 200 will include a DMA controller (not shown) to coordinate transfer of data to and from the host memory 108 and the processor 104. A graphics processor 204 is coupled to the bus interface 200 and is designed to perform various graphics and video processing functions, such as, but not limited to, generating vertex data and performing vertex transformations for polygon graphics primitives that are used to model 3D objects. The graphics processor 204 is coupled to a triangle engine 208 that includes circuitry for performing various graphics functions, such as clipping, attribute transformations, rendering of graphics primitives, and generating texture coordinates for a texture map.

A pixel engine 212 is coupled to receive the graphics data generated by the triangle engine 208. The pixel engine 212 contains circuitry for performing various graphics functions, such as, but not limited to, texture application or mapping, bilinear filtering, fog, blending, and color space conversion. A memory controller 216 coupled to the pixel engine 212 and the graphics processor 204 handles memory requests to and from an local memory 220. The local memory 220 stores graphics data, such as source pixel color values and destination pixel color values. A display controller 224 is coupled to the memory controller 216 to receive processed destination color values for pixels that are to be rendered. Coupled to the display controller 224 is a resampling circuit 228 that facilitates resizing or resampling graphics images. As will be explained below, embodiments of the resampling circuit 228 according to embodiments of the present invention include a text detection circuit which identifies whether a sampling of pixels includes graphics data that represents text images. The output color values from the resampling circuit 228 are subsequently provided to a display driver 232 that includes circuitry to provide digital color signals, or convert digital color signals to red, green, and blue analog color signals, to drive the display 140 (FIG. 1).

Although the resampling circuit 228 is illustrated as being a separate circuit, it will be appreciated that the resampling circuit 228 may also be included in one of the aforementioned circuit blocks of the graphics processing system 132. For example, the resampling circuit 228 may be included in the graphics processor 204 or the display controller 224. In other embodiments, the resampling circuit 228 may be included in the display 140 (FIG. 1). Therefore, the particular location of the resampling circuit 228 is a detail that may be modified without deviating from the subject matter of the invention, and should not be used in limiting the scope of the present invention.

Figure 3:
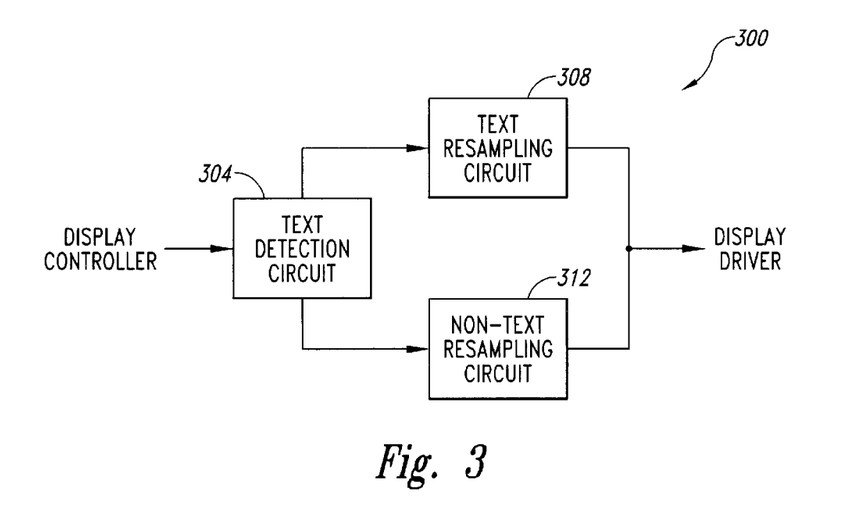
FIG. 3 is a block diagram of a resampling circuit in the graphics processing system of FIG. 2 according to an embodiment of the present invention.

FIG. 3 illustrates a resampling circuit 300 that may be substituted for the resampling circuit 228 shown in FIG. 2. The resampling circuit 300 includes a text detection circuit 304 for determining if a sample region of pixels is likely to contain two or fewer color values or color levels, such as when the sample region includes pixels representing text images. Also included in the resampling circuit 300 is a text resampling circuit 308 and a non-text resampling circuit 312. As mentioned previously, the resampling operations used for resampling graphics data representing text images is often different than that used for resampling other graphics data representing other types of graphics images, such as video. Although one resampling algorithm may be used, the image quality of one or the other types of graphics data will be compromised. Thus, two different resampling operations are used for the different types of graphics data, one for text performed by the text resampling circuit 308 and one for non-text performed by the non-text resampling circuit 312. The text resampling circuit 308 and the non-text resampling circuit 312 perform conventional resampling operations that are well known to those of ordinary skill in the art.

In operation, when a resampling operation is to be performed, the resampling circuit 228 (FIG. 2) becomes active and the text detection circuit 304 receives the sample values for the samples from the source image to be resampled. It will be appreciated that the sample values for the samples may consist of several different components. For example, the sample value may represent pixel colors which are the combination of red, green, and blue color components. Another example includes sample values representing pixel colors which are the combination of luma and chroma components. Consequently, because it is well understood in the art, although circuitry to perform graphics operation for each of the components is not expressly shown or described herein to avoid unnecessarily obscuring the present invention, embodiments of the present invention include circuitry, control signals, and the like necessary to perform resampling operations on each component for multi-component sample values. Moreover, it will be appreciated that embodiments of the present invention further include the circuitry, control signals, and the like necessary to perform axis separable operations for graphics data represented in multiple axes. Implementation of axis separable processing is well understood in the art, and a more detailed description of such has been omitted from herein also to avoid unnecessarily obscuring the present invention.

Based on a sampling of the pixels, the text detection circuit 304 determines whether the sample of pixels includes graphics data that represents text images. The determination of whether text images are included in the sample region is made by comparing the color levels of the sample pixels and determining if there are two or fewer color levels present. If so, the text detection circuit 304 identifies the graphics data as containing text and provides the graphics data to the text resampling circuit 308 for the resampling operation. All other graphics data is provided to the non-text resampling circuit 312 for the resampling operation. Each of the respective resampling circuits perform various operations to resample the graphics data received from the text detection circuit 304 for producing a resampled graphics image. The resampled data generated by the resampling circuits are subsequently used in the process of rendering enlarged or higher resolution graphics images.

Figure 4A:
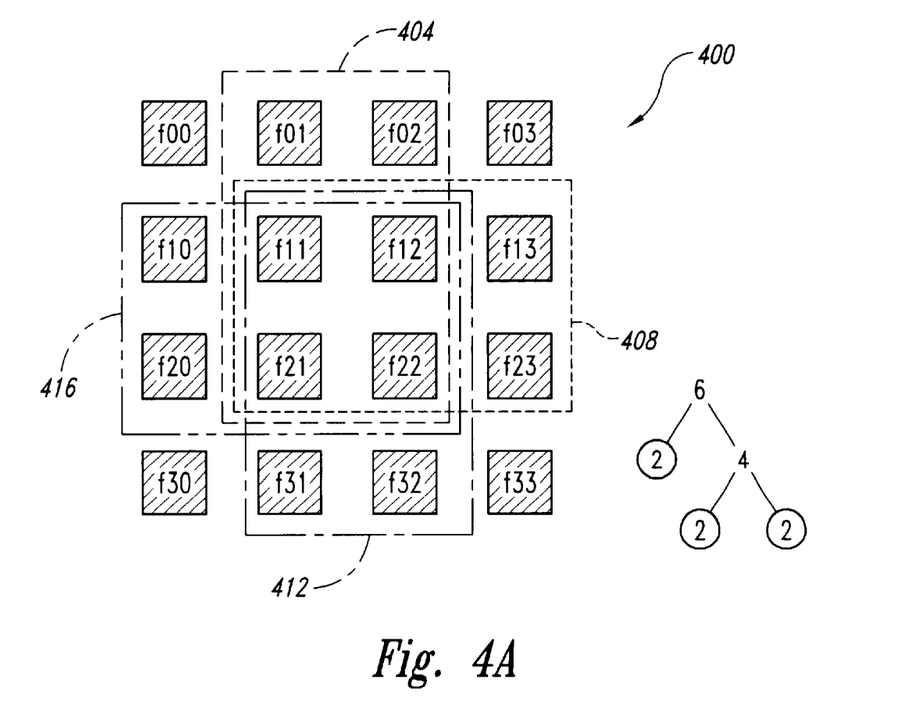
FIGS. 4a and 4b are diagrams representing a sample of pixels.

FIG. 4a illustrates pixels for a portion of a graphics image that is to be resampled. The sixteen pixels are arranged in a two-coordinate axes system and will be referenced herein by their coordinates $f_{00}$ to $f_{33}$. As illustrated in FIG. 4a, from the sixteen pixels $f_{00}$ to $f_{33}$ the text detection circuit 304 (FIG. 3) selects the graphics data associated with the pixels of four rectangular sample regions 404, 408, 412, and 416. Note that the pixels $f_{00}$, $f_{03}$, $f_{30}$, and $f_{33}$ are not included in any of the four sample regions selected by the text detection circuit 304. The four rectangular sample regions 404, 408, 412, and 416 each include six pixels, but are arranged to overlap such that four of the pixels, namely $f_{11}$, $f_{12}$, $f_{21}$, and $f_{22}$, are shared by the sample regions 404, 408, 412, and 416. As will be explained in more detail below, the sample level information for the overlap region will be used by each of the sample regions 404, 408, 412, and 416 to facilitate the text detection operation by the text detection circuit 304. Although the sample regions will be described herein as including only six sample pixels, it will be appreciated that the sample regions may be changed to include a different number of sample pixels and still remain within the scope of the present invention.

In operation, rather than comparing the sample values of all six pixels to each other to determine if two or fewer sample levels are present in the sample region, the text detection circuit 304 does a piece meal determination, and combines the results of each successive determination until one value representing the number of sample levels in the sample region is produced. The detection process is accomplished by reducing a sample region into sample pairs of pixels as follows. The text detection circuit 304 first reduces a sample region into at least one parent region. A parent region is split into two child regions, each of which contains at least a pair of sample pixels. A child region having more than one sample pair may itself be a parent region and further split into two child regions. The division of the pixels in a sample region continues recursively until the pixels are reduced to child regions having sample pairs.

Conceptually, the reduction of a sample region into child regions and sample pairs of pixels may be viewed as a tree structure having a minimum number of integer levels defined by:

levels of tree=ceil ($\log_2$(samples)), where samples is the number of pixel samples included in the sample region, and the ceil operation provides the smallest whole number greater than, or equal to the operand, which in this case is $\log_2$ (samples). In the present example, where six pixel samples are included in a sample region, the minimum number of tree levels required is three.

Figure 4B:
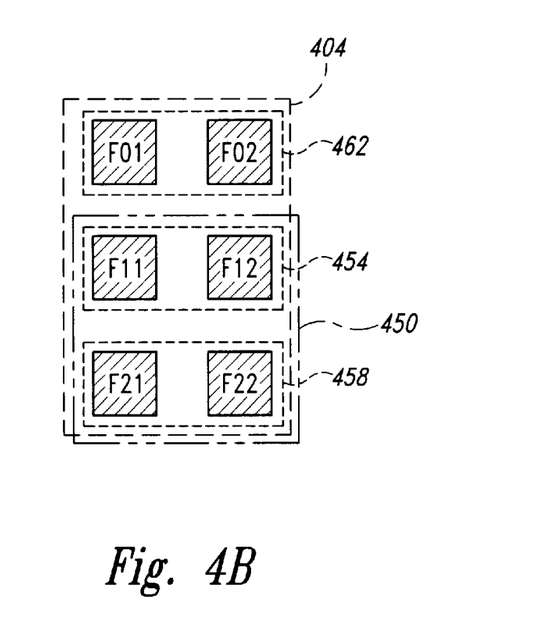

The reduction of a sample region into child regions of sample pairs of pixels will be illustrated by the following example. As illustrated in FIG. 4b, the sample region 404 includes the six pixels $f_{01}$, $f_{02}$, $f_{11}$, $f_{12}$, $f_{21}$, and $f_{22}$. The sample region 404 is reduced into at least one parent region 450, which in order to facilitate the detection operation, includes the four pixels $f_{11}$, $f_{12}$, $f_{21}$, and $f_{22}$. As mentioned previously, the results of the comparison for these four pixels will be shared between the four sample regions 404, 408, 412, and 416. The parent region 450 is reduced into two child regions 454 and 458, each of which includes a sample pair of pixels. Although it is not significant how the four pixels of the parent region 450 are divided into two child regions, for the sake of providing an example, the pixels are split such that a first child region 454 includes pixels $f_{11}$ and $f_{12}$, and a second child region 458 includes pixels $f_{21}$, and $f_{22}$. The remaining pixels of the sample region 404, that is, pixels $f_{01}$, and $f_{02}$, are included in a child region 462.

With respect to a corresponding tree diagram representing the splitting of the sample region 404, the value 6 is at a top-level representing the six pixels in the sample region 404. At a second level stemming from the top-level are the values 4 and 2, representing the parent region 450 and the child region 462, respectively. The value 4 representing the parent region 450 is again reduced into a 2 for child region 454 and another 2 for child region 458 at a third (bottom) level. Generally, splitting should occur so as to make the number of levels left to descend on each child branch as near equal as possible in order to reduce the number of levels in the hierarchy and speed up detection as in hardware.

Following the recursive reduction of the sample region into sample pairs of pixels, the text detection circuit 304 performs a comparison of two of the sample pairs, and combines the results of the comparisons to produce a combined comparison result. The combined comparison result is in turn combined with the comparison result of another sample pair to produce a new combined comparison result. As mentioned previously, the process of comparing and combining comparison results of the sample pairs continues until a combined comparison result is produced for the entire sample region. This combined comparison result, which will be referred to as the sample region tally, is indicative of the number of sample levels present in the sample region. More specifically, the sample region tally indicates whether there are two or fewer sample levels present in the entire sample region. If any of the sample region tallies for the four sample regions 404, 408, 412, and 416 indicates the presence of two or fewer sample levels, then the text detection circuit 304 makes the determination that the graphics data of pixels $f_{00}$–$f_{33}$ represent text images.

When comparing the sample values or sample levels for a sample pair of pixels, the text detection circuit 304 determines whether there is one sample level, or two sample levels. When two sample levels are detected for a sample pair, the sample values are sorted by the text detection circuit

304 into a {min, max} output. The {min, max} output is returned to the child's parent region along with a tally of 2. In the case where only one sample level is detected, the sample level may be duplicated for the {min, max} output or the sample level may be stored only in min or max, as long as the parent knows which position it is found when it returns a tally of 1.

Following the comparison of the sample pairs of two child regions, the text detection circuit 304 compares the comparison results of the two child regions to produce a combined comparison result. The two comparison results are combined by the text detection circuit 304 as follows:

- If either child region has three or more levels (i.e., a tally of 3), then the parent cannot be text. In this case, the child's {min, max} values are ignored, aid the parent immediately returns a tally of 3 to its parent.
- If both child regions have two levels, then for the parent region to be text, the min and max values must be equal between the two child regions. If the min and max values of the both child regions are equal, a tally of 2 and either {min, max} pair is returned to the parent's parent. Otherwise a tally 3 is returned.
- If one child has only one level and the other child has two levels, then the value of the single level must be equal to either the min or max value of the other child for there potentially to be text. If this is true, the {min, max} values and a tally of 2 are returned to the parent's parent, otherwise a tally 3 is returned.
- If each child region has only one level, then the values of the child regions must be compared and sorted as described earlier with respect to a single child region.

In the present example, the text detection circuit 304 compares the sample pairs of child regions 454 and 458 initially, and a combined comparison result is produced for the parent region 450. The comparison result of the parent region 450 is in turn combined with the comparison result of the child region 462 to produce a sample region tally for the sample region 404. As a result, whether two or less sample levels are present in the sample region 404 is reduced to a single tally value associated with the sample region 404.

The text detection process is facilitated by performing the comparison previously described for the parent region 450 first, and subsequently using the result for the remaining child regions of the four sample regions 404, 408, 412, and 416. That is, the text detection circuit 304 initially obtains bottom-level comparison results for the sample pairs of the central parent region. The two sample pairs (four samples) are combined using the parent-child algorithm previously described. Finally, the results for the central two child regions are combined separately with each of the sample pairs within the sample regions 404, 408, 412, and 416, but outside the central parent region. Ultimately, each sample region will have a tally value indicating whether two or fewer color levels are present in the sample region. Note that at the top level with each sample region, the {min, max} values are no longer needed and the tally number is the only value that is tested to determine if the number of sample levels present in a sample region is two or less.

After determining a tally value for each of the four sample regions 404, 408, 412, and 416, based on the tally values, the text detection circuit 304 (FIG. 3) determines whether graphics data for the sample pixels should be provided to the text resampling circuit 308 or the non-text resampling circuit 312 for resampling. Where all of the four sample regions 404, 408, 412, and 416 has a tally of 3, the determination that the graphics data includes non-text information, such as video, is made, and the graphics data is provided to the non-text resampling circuit 312. However, where any of the tallies of the four sample regions are a 2 or 1, then the graphics data is considered as representing text images and provided to text resampling circuit 308 for resampling.

The description of the text detection circuit 304 as provided herein is sufficient for one of ordinary skill in the art to practice the invention. The text detection circuit 304 includes conventional logic that is well understood and may be implemented without undue experimentation. Consequently, detailed description of the circuitry of the detection circuit 304 has been omitted for the sake of brevity.

Figure 5:
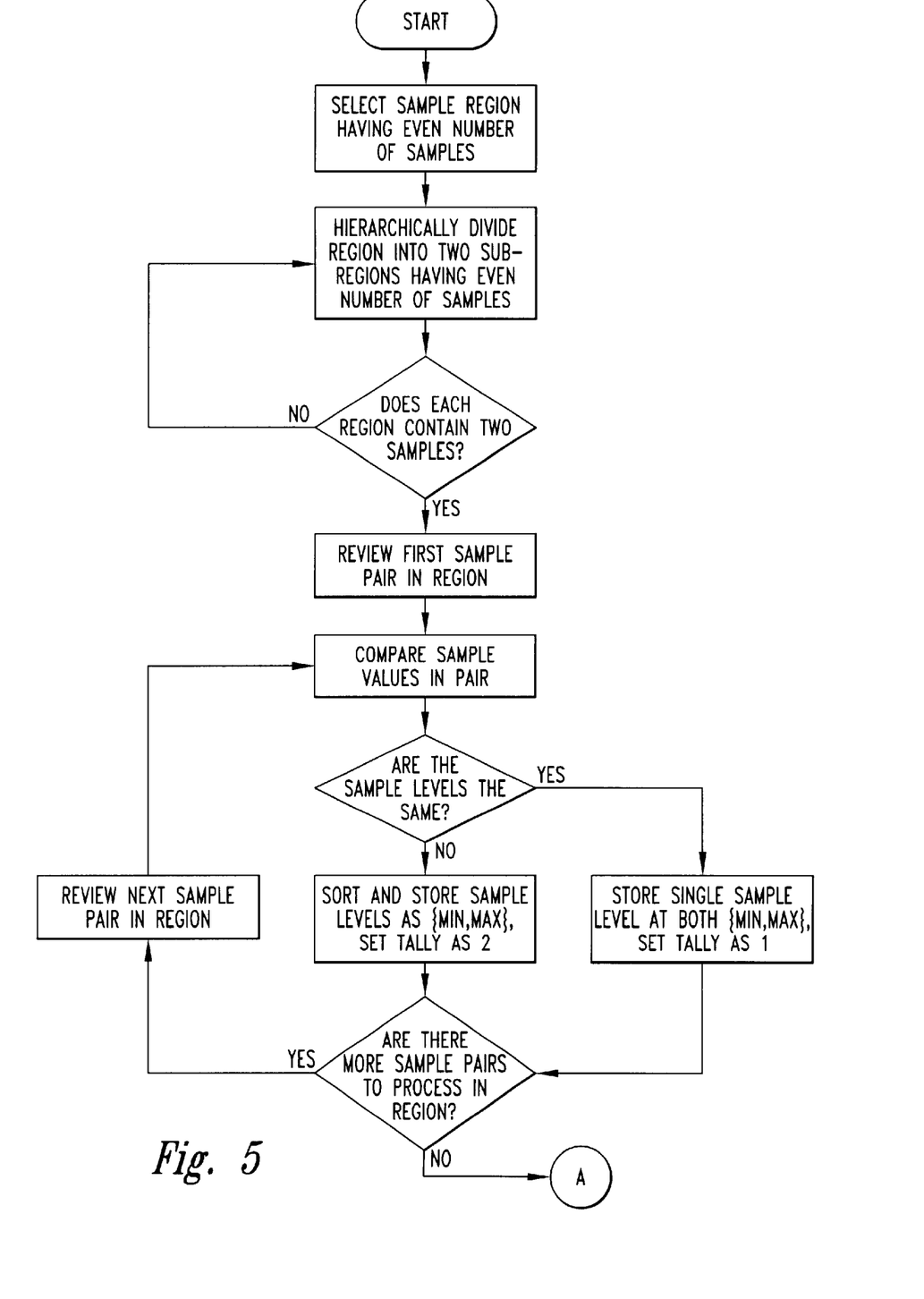
FIGS. 5–6 are flow diagrams of a text detection method according to embodiments of the present invention.
Figure 6:
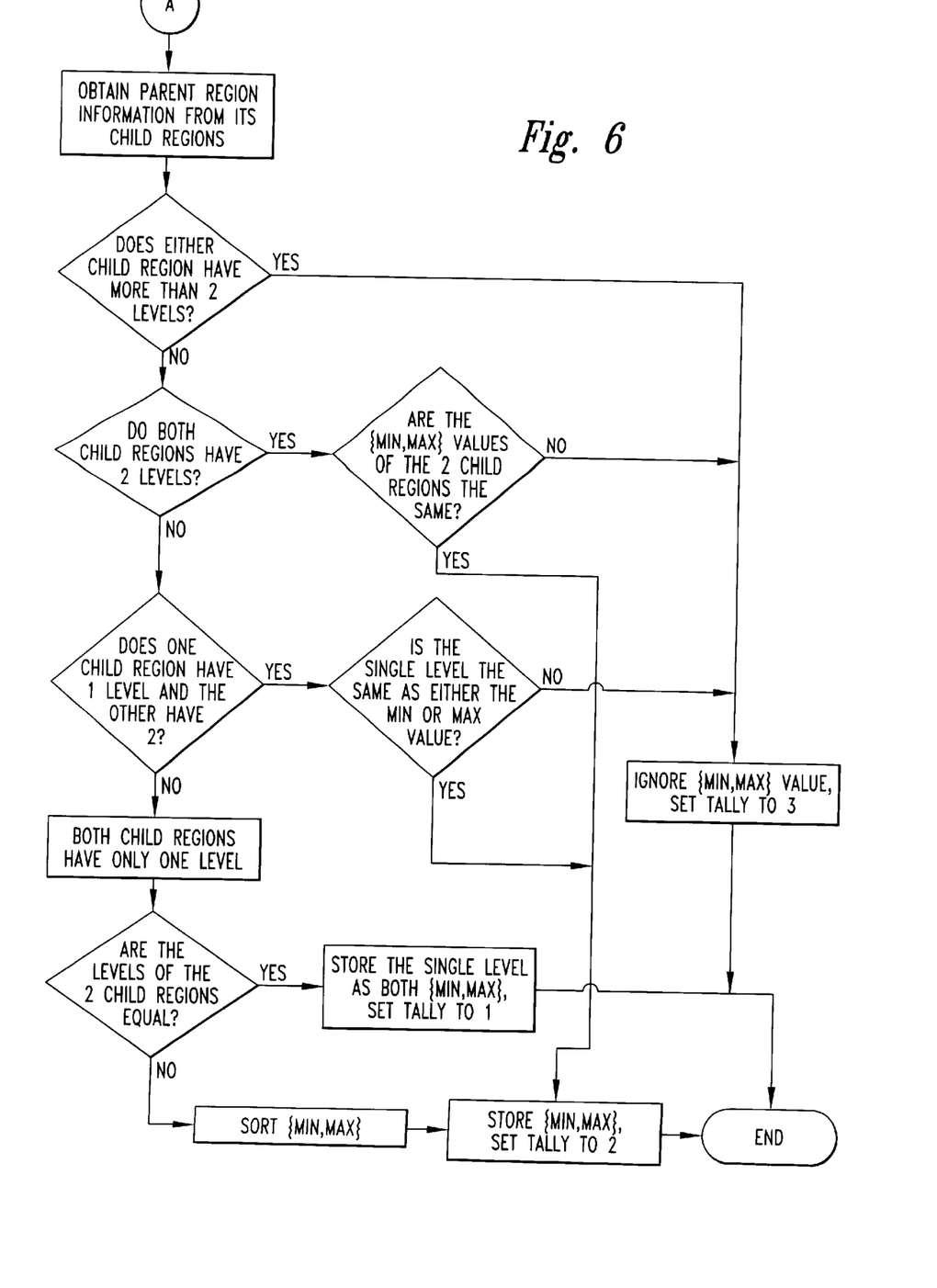

FIG. 5 illustrates a flow diagram of the comparison operation performed by the text detection circuit 304 (FIG. 3) when comparing the sample values of all sample pairs within a region. A sample region having an even number of samples is selected and then hierarchically sub-divided into regions with even numbers of samples. The sub-regions are sub-divided until all regions contain just two samples each. Each of the two sample regions are then processed to determine if it contains two or one sample levels, returning the sorted sample values and number of different levels to its parent region in the hierarchy. Following the completion of the comparison operation for the region, the text detection circuit 304 performs the parent comparison operation as illustrated in the flow diagram of FIG. 6 to produce a combined comparison tally for each parent region in the hierarchy. As shown the flow diagram illustrated in FIG. 6, upon determining that there are more than two sample levels in a parent or child region, the region's {min, max} values are ignored, and the region immediately returns a tally of 3 to its parent. Where two or less sample levels present in a parent or child region, the sample levels are sorted and stored as {min, max} values and a tally of 2 or 1 is set for the region. The comparison operation for remaining child or parent regions continues until a tally value for the sample region is determined. As mentioned previously, following the determination of a tally value for each sample region, the tally values are used by the text detection circuit to determine to which resampling circuit the graphics data is provided to carry out the enlarging operation.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for identifying in a sample region of pixel samples having sample values whether two or fewer sample values are represented, the method comprising:

hierarchically dividing the samples of the sample region into sample pairs;

comparing the sample values of a first sample pair and a second sample pair to determine if two or fewer sample values are represented by the sample values of the first and second sample pairs;

generating a tally value and recording first and second sample values if two or fewer levels are represented; and until the remaining sample pairs of the sample region have been compared and a combined tally value for the sample region is produced, comparing the recorded sample values to the sample values of another sample pair to determine if two or fewer values are represented and generating a new tally value and recording the sample values if two or fewer sample values are represented.

2. The method of claim 1 wherein comparing the sample values of the first and second sample pair comprises:

determining maximum and minimum sample values for the first sample pair and the second sample pair; and comparing the maximum and minimum values of the first and second sample pairs.

3. The method of claim 2 wherein the first and second sample values comprise the maximum and minimum values, respectively.

4. The method of claim 1 wherein the generating a tally value and recording first and second sample values comprises:

if two different sample values are represented by the sample values of the first and second sample pairs, setting a tally value of two and recording maximum and minimum sample values of the two sample pairs as the first and second sample values, respectively; and if only one sample value is represented by the sample values of the first and second sample pairs, setting a tally value of one and recording the one sample value for both the first and second sample values.

5. The method of claim 4, further comprising generating a tally value of three if three or more sample values are represented by the sample values of the first and second sample pairs.

6. A method for identifying in a region of pixel samples, each sample having an associated sample value, whether two or fewer sample values are represented, the method comprising:

selecting a sample region of pixel samples;

hierarchically dividing the samples of the sample region into sample pairs;

comparing the sample values of a first sample pair and a second sample pair to determine if two or fewer sample values are represented by the sample values of the first and second sample pairs;

generating a tally value and recording first and second sample values if two or fewer levels are represented; and until the remaining samples of the sample region have been compared and a combined tally value for the sample region is produced, comparing the recorded sample values to the sample values of another sample pair to determine if two or fewer values are represented and generating a new tally value and recording the sample values if two or fewer sample values are represented.

7. The method of claim 6 wherein the sample region comprises a 2×3 rectangular sample region.

8. The method of claim 6 wherein the sample region comprises a 3×2 rectangular sample region.

9. The method of claim 6 wherein comparing the sample values of the first and second sample pair comprises:

determining maximum and minimum sample values for the first sample pair and the second sample pair; and comparing the maximum and minimum values of the first and second sample pairs.

10. The method of claim 9 wherein the first and second sample values comprise the maximum and minimum values, respectively.

11. The method of claim 6 wherein the generating a tally value and recording first and second sample values comprises:

if two different sample values are represented by the sample values of the first and second sample pairs, setting a tally value of two and recording maximum and minimum sample values of the two sample pairs as the first and second sample values, respectively; and if only one sample value is represented by the sample values of the first and second sample pairs, setting a tally value of one and recording the one sample value for both the first and second sample values.

12. The method of claim 11, further comprising setting a tally value of three if three or more different sample values are represented by the sample values of the first and second sample pairs.

13. The method of claim 6 wherein selecting a sample region comprises selecting four overlapping rectangular sample sub-regions each including six samples sharing a central 2×2 overlapping sample sub-region.

14. The method of claim 13 wherein comparing the sample values of a first sample pair and a second sample pair comprises comparing first and second sample pairs of the central 2×2 overlapping sample sub-region, comparing the recorded sample values to the sample values of another sample pair comprises comparing the recorded sample values of the 2×2 overlapping sample sub-region to sample values of the remaining sample pair of each rectangular sample sub-region, and generating a new tally value comprises generating a tally value for each rectangular sub-region.

15. A method for identifying in a region of pixel samples, each sample having an associated sample value, whether two or fewer sample values are represented, the method comprising:

selecting from the region of samples a plurality of sample regions sharing an overlapping region of samples;

dividing the samples of the overlapping region and any remaining samples of each sample region into sample pairs;

comparing the sample values of a first sample pair and a second sample pair of the overlapping region to determine if two or fewer sample values are represented by the sample values of the first and second sample pairs;

generating a tally value and recording first and second sample values if two or fewer levels are represented in the overlapping region; and comparing the sample values of remaining sample pairs of each sample region to the first and second sample values of the overlapping region and generating a tally value for each sample region if two or fewer sample levels are represented in the sample region.

16. The method of claim 15 wherein the overlapping region comprises a central 2×2 region of samples and each sample region comprises a rectangular sample region including six samples.

17. The method of claim 15 wherein comparing the sample values of the first and second sample pair comprises:

determining maximum and minimum sample values for the first sample pair and the second sample pair; and comparing the maximum and minimum values of the first and second sample pairs.

18. The method of claim 17 wherein the first and second sample values comprise the maximum and minimum values, respectively.

19. The method of claim 15 wherein the generating a tally value and recording first and second sample values comprises:

if two different sample values are represented by the sample values of the first and second sample pairs, setting a tally value of two and recording maximum and minimum sample values of the two sample pairs as the first and second sample values, respectively; and if only one sample value is represented by the sample values of the first and second sample pairs, setting a tally value of one and recording the one sample value for both the first and second sample values.

20. The method of claim 19, further comprising generating a tally value of three if three or more sample values are represented by the sample values of the first and second sample pairs.

21. A method for identifying in a sample region of pixel samples, each sample having an associated sample value, whether two or fewer sample values are represented, the method comprising:

determining max and min sample values of first and second sample pairs;

comparing the max and min values of the first and second sample pairs, if three or more different sample values are represented, set a tally value of three for the entire sample region if two different sample values are represented, set a tally value of two and record max and min values of the two sample pairs as combined min and max values, and if only one sample value is represented, set a tally value of one and record the one sample value as combined min and max values; and continue comparing the combined min and max values with sample values of remaining sample pairs until a combined tally value for the entire sample region is determined.

22. The method of claim 21 wherein the sample region comprises four overlapping rectangular sample sub-regions each including six samples sharing a central 2×2 overlapping sample sub-region.

23. The method of claim 21 wherein comparing the sample values of the first and second sample pair comprises:

determining maximum and minimum sample values for the first sample pair and the second sample pair; and comparing the maximum and minimum values of the first and second sample pairs.

24. A color detection circuit adapted to receive signals representing respective sample values for pixel samples and detect whether two or fewer sample values are represented by the pixel samples, the detection circuit selecting a sample region of pixel samples, hierarchically dividing the samples of the sample region into sample pairs, comparing the sample values of a first sample pair and a second sample pair to determine if two or fewer sample values are represented by the sample values of the first and second sample pairs, generating a tally value and recording first and second sample values if two or fewer levels are represented, and until the remaining sample pairs of the sample region have been compared, comparing the recorded sample values to the sample values of another sample pair to determine if two or fewer values are represented and generating a new tally value and recording the sample values if two or fewer sample values are represented.

25. The detection circuit of claim 24 wherein the first and second sample values comprise maximum and minimum sample values and comparing the sample values of the first and second sample pair by the circuit comprises:

determining maximum and minimum sample values for the first sample pair and the second sample pair; and comparing the maximum and minimum values of the first and second sample pairs.

26. The detection circuit of claim 24 wherein generating a tally value and recording first and second sample values by the circuit comprises:

if two different sample values are represented by the sample values of the first and second sample pairs, setting a tally value of two and recording maximum and minimum sample values of the two sample pairs as the first and second sample values, respectively; and if only one sample value is represented by the sample values of the first and second sample pairs, setting a tally value of one and recording the one sample value for both the first and second sample values.

27. The detection circuit of claim 26, further adapted to set a tally value of three if three or more different sample values are represented by the sample values of the first and second sample pairs.

28. The detection circuit of claim 24 wherein selecting a sample region by the circuit comprises selecting four overlapping rectangular sample sub-regions each including six samples sharing a central 2×2 overlapping sample sub-region.

29. The detection circuit of claim 28 wherein comparing the sample values of a first sample pair and a second sample pair by the circuit comprises comparing first and second sample pairs of the central 2×2 overlapping sample sub-region, comparing the recorded sample values to the sample values of another sample pair comprises comparing the recorded sample values of the 2×2 overlapping sample sub-region to sample values of the remaining sample pair of each rectangular sample sub-region, and generating a new tally value comprises generating a tally value for each rectangular sub-region.

30. A graphics processing system, comprising:

a bus interface for coupling to a system bus;

a graphics processor coupled to the bus interface to process graphics data;

address and data busses coupled to the graphics processor to transfer address and graphics data to and from the graphics processor;

display logic coupled to the data bus to drive a display; and a color detection circuit coupled to the graphics processor and display logic and adapted to receive signals representing respective sample values for pixel samples and detect whether two or fewer sample values are represented by the pixel samples, the detection circuit selecting a sample region of pixel samples, hierarchically dividing the samples of the sample region into sample pairs, comparing the sample values of a first sample pair and a second sample pair to determine if two or fewer sample values are represented by the sample values of the first and second sample pairs, generating a tally value and recording first and second sample values if two or fewer levels are represented, and until the remaining sample pairs of the sample region have been compared, comparing the recorded sample values to the sample values of another sample pair to determine if two or fewer values are represented and generating a new tally value and recording the sample values if two or fewer sample values are represented.

31. The graphics processing system of claim 30 wherein the first and second sample values comprise maximum and minimum sample values and detection circuit compares the sample values of the first and second sample pair by determining maximum and minimum sample values for the first sample pair and the second sample pair, and comparing the maximum and minimum values of the first and second sample pairs.

32. The graphics processing system of claim 30 wherein the detection circuit generates a tally value and records first and second sample values by, if two different sample values are represented by the sample values of the first and second sample pairs, setting a tally value of two and recording maximum and minimum sample values of the two sample pairs as the first and second sample values, respectively, and, if only one sample value is represented by the sample values of the first and second sample pairs, setting a tally value of one and recording the one sample value for both the first and second sample values.

33. The graphics processing system of claim 32 wherein the detection circuit further sets a tally value of three if three or more different sample values are represented by the sample values of the first and second sample pairs.

34. The graphics processing system of claim 24 wherein the detection circuit selects a sample region by selecting four overlapping rectangular sample sub-regions each including six samples sharing a central 2×2 overlapping sample sub-region.

35. The graphics processing system of claim 34 wherein the detection circuit compares the sample values of a first sample pair and a second sample pair by comparing first and second sample pairs of the central 2×2 overlapping sample sub-region, comparing the recorded sample values to the sample values of another sample pair comprises comparing the recorded sample values of the 2×2 overlapping sample sub-region to sample values of the remaining sample pair of each rectangular sample sub-region, and generating a new tally value comprises generating a tally value for each rectangular sub-region.

36. A computer system, comprising:
   a system processor;
   a system bus coupled to the system processor;
   a system memory coupled to the system bus; and
   a graphics processing system coupled to the system bus, the graphics processing system, comprising:
      a bus interface for coupling to the system bus;
      a graphics processor coupled to the bus interface to process graphics data;
      address and data busses coupled to the graphics processor to transfer address and graphics data to and from the graphics processor;
      display logic coupled to the data bus to drive a display; and
      a color detection circuit coupled to the graphics processor and display logic and adapted to receive signals representing respective sample values for pixel samples and detect whether two or fewer sample values are represented by the pixel samples, the detection circuit selecting a sample region of pixel samples, hierarchically dividing the samples of the sample region into sample pairs, comparing the sample values of a first sample pair and a second sample pair to determine if two or fewer sample values are represented by the sample values of the first and second sample pairs, generating a tally value and recording first and second sample values if two or fewer levels are represented, and until the remaining sample pairs of the sample region have been compared, comparing the recorded sample values to the sample values of another sample pair to determine if two or fewer values are represented and generating a new tally value and recording the sample values if two or fewer sample values are represented.

37. The computer system of claim 36 wherein the first and second sample values comprise maximum and minimum sample values and detection circuit compares the sample values of the first and second sample pair by determining maximum and minimum sample values for the first sample pair and the second sample pair, and comparing the maximum and minimum values of the first and second sample pairs.

38. The computer system of claim 36 wherein the detection circuit generates a tally value and records first and second sample values by, if two different sample values are represented by the sample values of the first and second sample pairs, setting a tally value of two and recording maximum and minimum sample values of the two sample pairs as the first and second sample values, respectively, and, if only one sample value is represented by the sample values of the first and second sample pairs, setting a tally value of one and recording the one sample value for both the first and second sample values.

39. The computer system of claim 38 wherein the detection circuit further sets a tally value of three if three or more different sample values are represented by the sample values of the first and second sample pairs.

40. The computer system of claim 36 wherein the detection circuit selects a sample region by selecting four overlapping rectangular sample sub-regions each including six samples sharing a central 2×2 overlapping sample sub-region.

41. The computer system of claim 40 wherein the detection circuit compares the sample values of a first sample pair and a second sample pair by comparing first and second sample pairs of the central 2×2 overlapping sample sub-region, comparing the recorded sample values to the sample values of another sample pair comprises comparing the recorded sample values of the 2×2 overlapping sample sub-region to sample values of the remaining sample pair of each rectangular sample sub-region, and generating a new tally value comprises generating a tally value for each rectangular sub-region.

* * * * *

UNITED STATES PATENT AND TRADEMARK OFFICE
CERTIFICATE OF CORRECTION

PATENT NO. : 6,690,826 B2
DATED : February 10, 2004
INVENTOR(S) : Keith R. Slavin It is certified that error appears in the above-identified patent and that said Letters Patent is hereby corrected as shown below:

Title page,
Item [*] Notice, "Subject to any disclaimer, the term of this patent is extended or adjusted under 35 U.S.C. 154(b) by 500 days." should read -- Subject to any disclaimer, the term of this patent is extended or adjusted under 35 U.S.C. 154(b) by 565 days. --

Column 1,
Line 21, "and have appear to have" should read -- and appear to have --
Line 29, "such as a" should read -- such as --
Line 57, "gets the monitor" should read -- gets to the monitor --

Column 2,
Line 27, "with even number of samples" should read -- with even numbers of samples --

Column 3,
Line 10, "operator or an" should read -- operator of an --

Column 4,
Line 6, "from an local memory 220." should read -- from a local memory 220. --
Lines 58-59, "to be resa-mpled." should read -- to be re-sampled. --
Line 66, "perform graphics operation" should read -- perform graphics operations --

Column 5,
Line 55, "does a piece meal" should read -- does a piecemeal --

Column 7,
Line 15, "ignored, aid the parent" should read -- ignored, and the parent --
Line 65, "has a tally of 3," should read -- have a tally of 3, --

UNITED STATES PATENT AND TRADEMARK OFFICE
CERTIFICATE OF CORRECTION

PATENT NO. : 6,690,826 B2
DATED : February 10, 2004
INVENTOR(S) : Keith R. Slavin It is certified that error appears in the above-identified patent and that said Letters Patent is hereby corrected as shown below:

<u>Column 8,</u>
Line 31, "sample levels present" should read -- sample levels are present --

Signed and Sealed this

Tenth Day of May, 2005

JON W. DUDAS
*Director of the United States Patent and Trademark Office*